United States Patent Office 3,432,448
Patented Mar. 11, 1969

3,432,448
METHOD OF PRODUCING HYDROPHILIC POLYURETHANE FOAM EMPLOYING A MONOALKOXY-POLYETHYLENE GLYCOL
Joerg Sambeth, Veyrier, Geneva, and Alexis Archipoff, Carouge, Geneva, Switzerland, assignors to Elekal, Paris, France
No Drawing. Filed Oct. 6, 1965, Ser. No. 493,573
Claims priority, application Switzerland, Oct. 14, 1964, 13,339/64
U.S. Cl. 260—2.5  3 Claims
Int. Cl. C08g 22/44, 22/14

ABSTRACT OF THE DISCLOSURE

Hydrophilic polyurethane foams produced by reacting at least one polyisocyanate with polypropylene glycol and at least one monoalkoxypolyethylene glycol of the formula $RO(CH_2-CH_2-O)_nH$ wherein R is methyl or ethyl and n is an integer of 3 to 30 inclusive. The reaction is effected at ambient temperature in the presence of water, a catalyst consisting of a mixture of stannous octoate and triethylene-diamine or N-ethylmorpholine, and at least one surface active agent.

---

This invention relates to the production of hydrophilic polyurethane foam.

Polyurethane foam is an alveolate material well suited to the manufacture of sponges intended for industrial or domestic use. When the foam is of the open cell type, it has the appearance of a natural sponge. The method generally used to produce polyurethane foams consists in causing a polyisocyanate to react with a polyester or polyether based polyol in the presence of water, a catalyst consisting of a mixture of stannous octoate and triethylene diamine or N-ethylmorpholine, and a surface active agent. Sponges of polyurethane foam produced according to this method suffer however from the drawback that their water absorption capacity is very slight, which of course is highly prejudicial to its use.

To obviate this disadvantage, various methods have been proposed for producing a hydrophilic polyurethane foam. According to some of these methods, hydrophilic mineral derivatives or surface-active agents are incorporated into the foam during synthesis. However, foams so obtained are not well suited to the manufacture of sponges because of the disappearance of the incorporated products and hence of the hydrophilic property after being washed a few times.

Other methods consist of adding polyethylene-glycol to the starting materials but they suffer from the disadvantage of yielding a foam which has a viscous feel and hence is very unpleasant to the touch.

An object of the invention is to eliminate the present disadvantages of these known methods.

To this end the present invention provides a method of producing a hydrophilic polyurethane foam, which comprises reacting at least one polyisocyanate, at ambient temperature and in the presence of water; a catalyst consisting of a mixture of stannous octoate and triethylenediamine or N-ethylmorpholine; at least one surface active agent with at least one polypropylene glycol and at least one monoalkoxypolyethylene glycol having the formula:

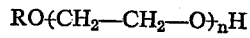

wherein R is methyl or ethyl and n is an integer of 3 to 30 inclusive.

The method according to the invention thus consists in using for the synthesis of the foam, in addition to the conventional starting materials which are the polyisocyanates and the polyols, the polyol being instantly limited to a polypropylene glycol, at least one monoalkoxypolyethylene glycol. The function of the latter, which is a hydrophilic derivative, consists in reacting with the polyisocyanate through its hydroxyl group and in keeping its alkoxy group free, thereby imparting hydrophilic properties to the foam without affecting its feel.

As regards the amount of monoalkoxypolyethylene glycol to be used, the best results were obtained with a quantity ranging from 5 to 30% parts by weight of that of the polypropylene glycol.

Among the polyisocyanates which can be used in the present invention, there are included: a mixture of 2,4- and 2,6-toluylene-diisocyanate, 1,5-naphthylene-diisocyanate, 1,4-naphthylene-diisocyanate, 4,4'-diphenylmethane-diisocyanate, para-phenylene-diisocyanate, hexamethylene-diisocyanate, 2,4-toluylene-diisocyanate-dimer, 1,4-diisocyanate-cyclohexane, 4,4',4''-triphenylmethane-triisocyanate, and polymethylene-polyphenylisocyanate.

As for the catalysts, the same as those which are used in the known methods are used. The same applies to the surface active agents.

The above-described method may for example be practised as shown in the following examples.

EXAMPLE 1

An intimate mixture of the following substances is prepared by stirring at ambient temperature:

| | |
|---|---|
| Polypropylene-glycol (M=2100) _____ parts __ | 92 |
| Monomethoxypolyethylene-glycol (M=164, n=3) parts __ | 8 |
| Total water _____ do ____ | 3.5 |
| Toluylene diisocyanate _____ TDI index | 105 |
| Silicone oil-3320 _____ parts __ | 1.5 |
| Stannous octoate _____ do ____ | 0.20 |
| Triethylene-diamine _____ do ____ | 0.20 |
| N-ethylmorpholine _____ do ____ | 0.20 | which mixture is then poured into a mold and left to foam.

The resultant foam has remarkable hydrophilic properties. These have been verified by:

(1) A conventional method which consists in determining the wetting time of a sponge (2 to 3 seconds for a sponge of usual size), (2) A conventional method which consists in measuring the capillary rise of water in a sponge (about 90 g./dm.² in one minute), (3) A conventional method which consists in measuring the wiping properties of a sponge.

EXAMPLE 2

The procedure is the same as in Example 1, but instead of 8 parts of monomethoxypolyethylene-glycol, use is made of 10 parts of a monoethoxypolyethylene-glycol having M= 350 and n=7.

EXAMPLE 3

The procedure is the same as in Example 1, but using 10 parts of a monomethoxypolyethylene-glycol having M=550 and n=12.

EXAMPLE 4

The procedure is the same as in Example 1, but using 10 parts of a monomethoxypolyethylene-glycol having M=750 and n=16.

EXAMPLE 5

The procedure is the same as in Example 1, but using 100 parts of polypropylene-glycol (M=2100), instead of 92, and, instead of monomethoxypolyethylene-glycol, a compound thereof with 4,4',4''-triphenylmethane-triisocyanate, to wit:

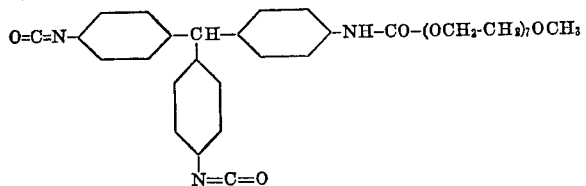

What is claimed is:

1. A hydrophilic polyurethane foam produced by reacting at least one organic polyisocyanate at ambient temperature with at least one polypropylene glycol and at least one monoalkoxypolyethylene glycol of the formula:

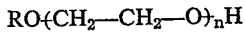

wherein R is methyl or ethyl and $n$ is in integer between 3 and 30 inclusive, said reacting being effected in the presence of water, a catalyst and at least one surface active agent.

2. A hydrophilic polyurethane foam as claimed in claim 1, wherein the catalyst is a mixture of stannous octoate and a tertiary amine selected from the group consisting of triethylene-diamine and N-ethylmorpholine.

3. A hydrophilic polyurethane foam as claimed in claim 1, wherein the organic polyisocyanate is selected from the group consisting of a mixture of 2,4- and 2,6-toluylene-diisocyanate,
1,5-naphthylene-diisocyanate,
1,4-naphthylene-diisocyanate,
4,4'-diphenylmethane-diisocyanate,
para-phenylene-diisocyanate,
hexamethylene-diisocyanate,
2,4-toluylene-diisocyanate-dimer,
1,4-diisocyanate-cyclo-hexane,
4,4'4''-triphenylmethane-triisocyanate, and
polymethylene-poly-phenylisocyanate.

References Cited

UNITED STATES PATENTS 2,965,584   12/1960   Elkin _____ 260—2.5

FOREIGN PATENTS 892,776   3/1962   Great Britain.
839,187   6/1960   Great Britain.

DONALD E. CZAJA, *Primary Examiner.*

MICHAEL B. FEIN, *Assistant Examiner.*